United States Patent [19]

Crane et al.

[11] Patent Number: 4,695,344

[45] Date of Patent: Sep. 22, 1987

[54] RESIN IMPREGNATION AND PROCESSING TECHNIQUE FOR RIGIDIZING NET-SHAPED FIBROUS SKELETAL COMPOSITE PREFORMS

[75] Inventors: Roger M. Crane, Baltimore; Aleksander B. Macander, Rockville, both of Md.

[73] Assignee: The United States of America as represented by the Secretary of the Navy, Washington, D.C.

[21] Appl. No.: 717,767

[22] Filed: Mar. 29, 1985

[51] Int. Cl.$^4$ .............................................. B32B 31/20
[52] U.S. Cl. ................................... 156/242; 156/245; 156/285; 156/286; 156/289; 156/307.1; 156/307.3
[58] Field of Search ............... 156/242, 245, 285, 286, 156/307.1, 307.3, 87, 289

[56] References Cited

U.S. PATENT DOCUMENTS

| | | | |
|---|---|---|---|
| 3,421,967 | 1/1969 | Hochner | 156/245 |
| 3,817,806 | 6/1974 | Anderson et al. | 156/285 |
| 4,016,022 | 4/1977 | Browning et al. | 156/285 |
| 4,046,937 | 9/1977 | McCaskey et al. | 156/307.3 |
| 4,252,592 | 2/1981 | Green | 156/242 |

OTHER PUBLICATIONS

Webster's New International Dictionary of the English Language, 1952, p. 546, "complex", 2 pages and p. 549, compound curve, 2 pages.
A New Dictionary of Chemistry, Jan. 23, 1950, p. 512, "thermoplastics" and thermosetting plastics, 2 pages.

*Primary Examiner*—Caleb Weston
*Attorney, Agent, or Firm*—Luther A. Marsh; Michael J. Gonet

[57] ABSTRACT

The invention relates to an impregnation and processing technique for dry fiber composite preform net shapes and ensures maximum mechanical properties in finished structural fiber reinforced composite parts especially in water, and results in composite parts with a low internal void content. The proposed process is not dependent on any pumping action whether due to vacuum or positive pressure to cause the resin to flow into and around the skeletal structure of the dry fiber preform. The process is essentially dependent on the concept of gravity flow in a sandwiched apparatus wherein neat resin cast sheets are placed on both faces of a dry fiber preform shape to create a prepregged (i.e., infiltrated) structure.

13 Claims, 3 Drawing Figures

RESIN IMPREGNATION AND PROCESSING TECHNIQUE FOR RIGIDIZING NET-SHAPED FIBROUS SKELETAL COMPOSITE PREFORMS

BACKGROUND OF THE INVENTION

Composite materials are finding more recognition today with the current increases in demand for strong and lightweight materials. This demand is felt in ship structures, both sea and air, as well as in land vehicle structures.

Since the recent development in composites consisting of densely braided net-shaped fiber skeletons, problems have arisen in effective resin impregnation using conventional resin impregnation techniques.

To date the process for the resin impregnation of net-shaped fibrous skeletal composite preforms and the rigidizing therefore has utilized either a vacuum or pressure impregnation technique. In the past the composite was placed in a closed mold which had impregnation and bleed tubing to the mold. Fluid resin was then pumped into the mold under pressure or drawn into the mold using a vacuum. When evidence of resin was seen from the bleed tubes, the impregnation is stopped and the panel cured using a recommended time/temperature cure cycle. This technique has two major limitations. First, the resin used must have a relatively low viscosity (35 to 100 poise at ambient temperature) and be thermally stable. The resin considered in this case is usually of an epoxy or a polyester type having suboptimal mechanical properties typically only requiring a room temperature cure.

The major drawback these low viscosity resins have is their hydrophilic (high water absorption) nature. Consequently structural properties of composites impregnated with these resins are severely degraded in a water/temperature environment. Second, the fiber packing must be loose enough to allow for the resin to flow through the dry fiber preform. This means that the parts fabricated using this technique, require low fiber volume fractions in order for the resin to flow under a vacuum or pressure, and as a result these composites have unsatisfactory mechanical properties. Furthermore, dry preforms impregnated with these conventional techniques can result in composites having undesirable characteristics, e.g. internal voids, surface porosity, etc.

SUMMARY OF THE INVENTION

The impregnation and processing technique developed by the inventors for densely braided net-shaped fiber skeleton composite preforms ensures maximum mechanical properties in finished structural fiber reinforced composite parts, especially in water, and results in composite parts with a low internal void content. The proposed process is not dependent on any pumping action whether due to vacuum or positive pressure to cause the resin to flow into and around the skeletal structure of the dry fiber preform. The process is essentially dependent on the concept of gravitational flow and wicking of the resin into a sandwiched apparatus wherein neat resin cast sheets are placed on both faces of the dry fiber preform shape to create a prepregged (infiltrated) structure. As a result of the improved impregnation and processing technique more viscous resins, which are less hydrophilic in nature, and higher fiber volume fraction dry fiber preforms can be used to achieve finished composite materials with superior mechanical properties. The details and secondary nature of vacuum and pressure is described in the following description of the invention. A thermosetting resin is used as an example.

OBJECTS OF THE INVENTION

The major advantage of this process is that composite preforms can be impregnated with more thermally stable structural resins and the composite preforms can have a higher fiber content, i.e. in excess of 65% by volume.

BRIEF DESCRIPTION OF THE DRAWINGS

A more complete appreciation of the invention and many of the attendant features thereof will be readily appreciated as the same becomes better understood by reference to the following detailed description when considered in connection with the accompanying drawings.

LEGEND OF THE DRAWINGS

Figure 1:
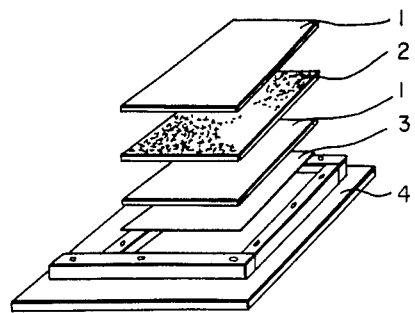
FIG. 1 shows a perspective exploded view of the assembly for impregnating a fiber preform with resin.
Figure 2:
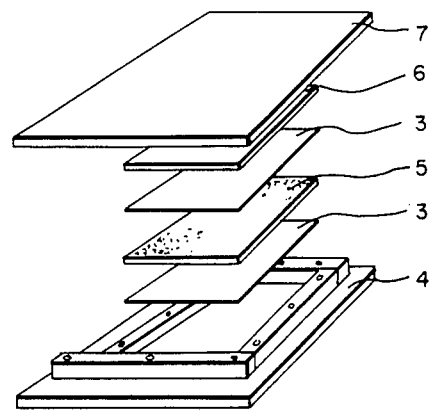
FIG. 2 shows a perspective exploded view of prepregged fiber preform assembly ready to be vacuum bagged.
Figure 3:
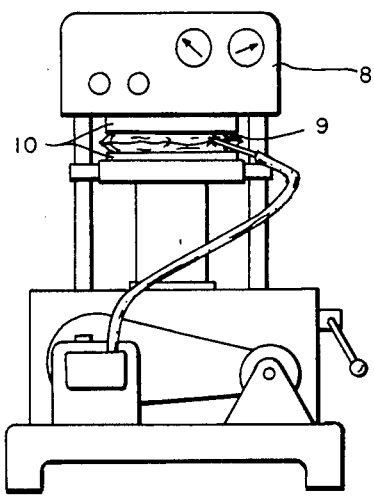
FIG. 3 shows the final consolidation of the prepregged composite preform assembly inside of a vacuum bag placed between the platens and heaters of a laminating press.

1.—Cast resin sheets
2.—Dry fiber preform
3.—Peel ply
4.—Adjustable open mold
5.—Prepregged composite preform
6.—Spacer material
7.—Pressure plate
8.—Laminating press
9.—Vacuum bagged assembly containing prepregged composite preform
10.—Press platens and heaters

DESCRIPTION OF THE INVENTION

High fiber volume fraction, dry fiber preforms considered in this invention are essentially through-the-thickness braided fiber reinforced composite materials. The generic name for this new composite technology is matrix braiding. Matrix braided composites consist of net-shaped, densely braided fiber skeletons, which are usually rigidized with conventional epoxy resin systems. Matrix braided composites utilize multidimensional (X-D) braiding consisting of a network of fibers oriented in a multitude of directions including through-the-thickness. This X-D braided technology is more fully described in U.S. Pat. Nos. to Bluck No. 3,426,804 and Florentine No. 4,312,261 which are both hereby incorporated by reference.

Multidimensional braiding has emerged as an alternate to conventional laminated composites. The absence of individual laminae in X-D braiding, produces a structure with improved toughness and increased resistance to crack growth. However conventional techniques for impregnating the dry X-D preform material have proven less than effective. The importance of the impregnation step cannot be understated as it is a controlling factor that guarantees the quality and desired fiber volume of the finished product. Referring now to the drawings wherein like reference characters designate identical or corresponding parts throughout the several views.

A typical thermosetting 350 degrees F., amine cured epoxy resin is used as an example in the description of the invention. The initial step calls for the B-staged (partial polymerization) casting of a 350 degrees F. cure structural thermosetting epoxy into cast resin sheets 1 approximately ⅛ in. or thicker depending on the dry fiber preform thickness. This is done by melting the epoxy at 250 degrees F. until it becomes fluid and pouring it onto a casting plate. This is allowed to cool and harden. At this stage the resin is B-staged, not cured.

A closed mold 4 of appropriate dimensions is prepared having a depth in excess of the desired thickness of the finished composite part. Two sheets of the resin are then cut to fit the mold. A piece of peel ply 3 is first placed in the adjustable open mold 4. Next, a piece of resin 1 is placed in the mold. On top of this is placed the dry fiber preform 2 to be impregnated. Another sheet of cut resin 1 is placed on top of the dry fiber preform 2.

The apparatus is put in a vacuum oven heated to 250 degrees F. with a vacuum of 30 in. Hg. Air is removed from the preform and the melting resin thus allowing a more positive wicking action and gravitational flow of the resin into the dry fiber preform. After the preform is saturated and the system free of any entrapped air, the vacuum is released and the mold is taken out of the oven. At this point in the process, the preform is still in a B-staged condition. Another piece of peel ply 3 is placed over the now saturated preform.

The next step in the process is to place a spacer material 6 over the layered apparatus to control the final thickness of the preform panel. To control face smoothness and parallelness, a pressure plate 7 is placed over the mold and the entire assembly is vacuum bagged 9.

The assembly is then placed between the press platens and heaters 10 of a laminating press, or the assembly could in the alternative be placed in an autoclave (not shown), and the saturated preform is cured using the recommended time/temperature 1 pressure cycle. This process produces panels of a consistent fiber and resin volume fraction with an internal void content of less than one percent.

ADVANTAGES

The specific advantages of the process are: precise control of thickness and fiber volume fraction; superior material quality with virtually no internal voids (i.e., <1%) or surface anomalies; improved composite mechanical properties resulting from the use of structural epoxy resins having improved environmental stability; adaptability to impregnation and processing of various structural shapes; reduced composite fabrication costs due to "finished" condition of the composite part made from the net-shaped fiber preform in a closed, matched mold; and the elimination of all plumbing requirements for vacuum pressure in the resin impregnation step of the dry fiber preform.

It will be understood that variations and modifications may be effected without department from the spirit and scope of the novel concepts of this invention.

What is claimed is:

1. A method for fabricating a composite material into shapes comprising:

supplying at least one impregnating resin sheet;

providing a layered apparatus by preparing a closed type mold having a depth in excess of a finished thickness of said composite material;

placing a sheet of peel ply on said closed type mold to aid in disassembly;

placing at least one of said impregnating resin sheets on said peel ply;

placing a fiber preform to be impregnated with said impregnating resin on said at least one of said impregnating resin sheets;

placing at least another impregnating resin sheet on said fiber preform;

placing the layered apparatus in a vacuum oven;

heating the layered apparatus and removing air from the layered apparatus wherein wicking action and gravitational flow result in said impregnating resin material saturating said fiber preform;

removing the layered apparatus from said vacuum oven;

placing another sheet of peel ply on the layered apparatus to aid in disassembly;

placing a spacer in said closed mold for controlling said finished thickness of said saturated fiber preform;

placing a pressure plate over said closed type mold;

vacuum bagging the assembly;

placing the vacuum bagged assembly in a means for processing the vacuum bagged assembly for a recommended time, temperature and pressure sufficient for curing or hardening said composite material shapes;

and processing the vacuum bagged assembly for a recommended time and temperature and pressure sufficient for curing or hardening said composite material shapes.

2. The method for fabricating a composite material into shapes according to claim 1, wherein:

the impregnating resin has a high viscosity.

3. The method for fabricating a composite material into shapes according to claim 2, wherein:

the impregnating resin has a viscosity generally greater than a range of from 35 to 100 poise at ambient temperature.

4. The method for fabricating a composite material into shapes according to claim 1, wherein:

the shapes include I-beam and C-channel shapes.

5. The method for fabricating a composite material into shapes according to claim 1, wherein:

the fiber preform has a high fiber volume fraction.

6. The method for fabricating a composite material into shapes according to claim 5, wherein:

the fiber preform has a fiber volume generally greater than sixty percent by volume.

7. The method for fabricating a composite material into shapes according to claim 1, wherein:

the means for pressing the vacuum bagged assembly for a recommended time and temperature and pressure sufficient for curing said composite material shapes is a laminating press or autoclave.

8. The method for fabricating a composite material into shapes according to claim 1, wherein:

said composite material when finished has an internal void content of less than one percent.

9. The method for fabricating a composite material into shapes according to claim 1, wherein:

said fiber preform is matrix braided.

10. The method for fabricating a composite material into shapes according to claim 1, wherein:

said fiber is a multidimension braided structure.

11. The method for fabricating a composite material into shapes according to claim 1, wherein:
said fiber preform is braided in more than two dimensions.

12. The method for fabricating a composite material into shapes according to claim 1, wherein:
said impregnating resin material is thermosetting.

13. The method for fabricating a composite material into shapes according to claim 1, wherein:
said impregnating resin material is thermoplastic.